June 16, 1931.   C. B. GARWOOD   1,809,894

CLOSURE FOR BOTTLES, JARS, AND THE LIKE

Filed May 12, 1930

C. B. Garwood
Inventor

By C A Snow & Co.
Attorneys

Patented June 16, 1931

1,809,894

UNITED STATES PATENT OFFICE

CHARLES B. GARWOOD, OF LINTHICUM HEIGHTS, MARYLAND, ASSIGNOR TO CARR-LOWREY GLASS CO., OF BALTIMORE, MARYLAND

CLOSURE FOR BOTTLES, JARS, AND THE LIKE

Application filed May 12, 1930. Serial No. 451,783.

This invention relates to a closure for use in connection with containers such as bottles, jars, and the like formed of glass or other materials.

It is an object of the invention to provide a closure utilizing a gasket of rubber or similar elastic material so located that, by manipulation of the closure it becomes possible to bind the gasket upon the outer surface of the neck portion of the container so as to hold the closure in place securely and at the same time make an efficient seal.

A further object is to provide a closure especially adapted to be used where flat or substantially flat tops are desired on which trade marks, etc., can be displayed.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings

Figure 1:
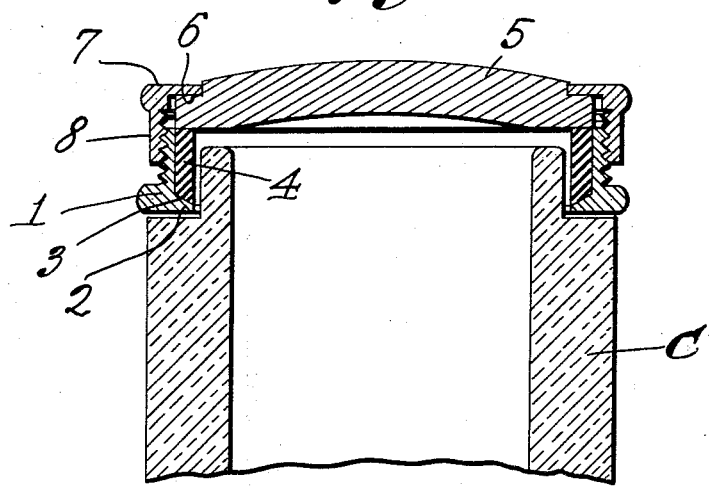
Figure 1 is a section through the closure applied to a container but not fastened thereto.
Figure 2:
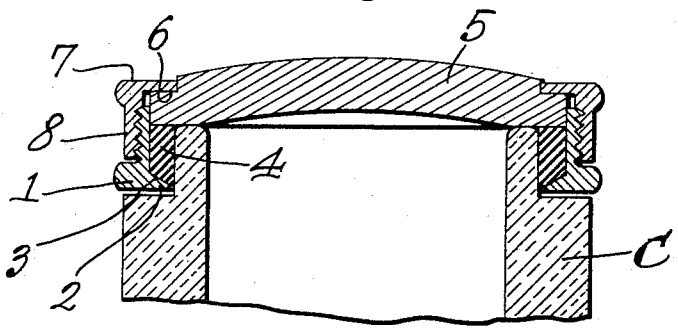
Figure 2 is a similar view showing the closure sealed on the container.
Figure 3:
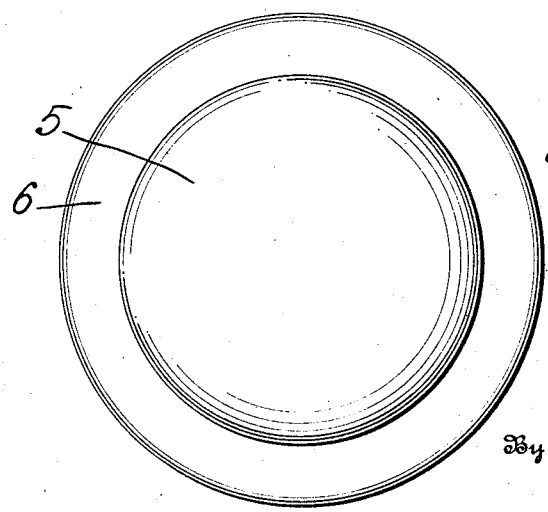
Figure 3 is a plan view of the closure.

Referring to the figures by characters of reference, 1 designates a ring having a continuous flange 2 extending thereinto from its lower edge. The upper surface of the flange forms an inclined shoulder 3 on which is supported a gasket 4 formed of rubber or other material of a similar nature. The internal diameter of this gasket is slightly greater than the external diameter of that portion of a container C to which the closure is to be applied.

The gasket 4 provides a seat for the marginal portion of a cap disk 5 which can be made of glass or other material and can be of any desired configuration. The marginal portion of this disk is preferably reduced to provide a seat 6 for a cap ring 7 the marginal portion 8 of which is internally screw threaded for engagement with corresponding threads on the outer surface of the ring 1.

When it is desired to apply this closure to a container it is placed therearound with the gasket 4 extending close to the outer surface of the container. Ring 7 is then screwed downwardly on the ring 1, causing the disk 5 to compress gasket 4 against the inclined shoulder 3. Consequently the gasket will bulge inwardly and tightly engage the surface of the container.

When the gasket is compressed as described, it will hold the closure by friction against accidental detachment from the container. It will also seal the container. When it is desired to remove the closure, the gasket is relieved from compression by partly unscrewing ring 7 from ring 1.

As before stated the disk 5 can be moulded of any material desired and can be suitably ornamented or carry any desired display matter.

Obviously various modifications of this closure can be made to adapt it for use with containers of different sizes and shapes.

What is claimed is:

1. A closure of the class described including a ring having an internal inclined shoulder, a gasket fitted snugly in the ring and supported by the shoulder, a cap disk seated at its margin on the gasket, and a ring lapping the disk and in screw-threaded engagement with the first named ring.

2. A closure of the class described including a ring having an internal, annular, inclined shoulder, a gasket fitted snugly within the ring and supported by the shoulder, a cap disk seated at its margin on the gasket, and a ring screwed on the first named ring and engaging the disk for compressing the gasket between the disk and shoulder and bulging it inwardly from the rings.

In testimony that I claim the foregoing as my own, I have hereto affixed my signature.

CHARLES B. GARWOOD.